July 22, 1947.   H. G. HOFFER   2,424,235

INJECTION MOLD

Filed Nov. 28, 1944

HOWARD G. HOFFER,
INVENTOR.

BY

ATTORNEY.

Patented July 22, 1947

2,424,235

UNITED STATES PATENT OFFICE 2,424,235

INJECTION MOLD

Howard G. Hoffer, Santa Monica, Calif., assignor to Teksun Inc., West Los Angeles, Calif., a corporation of California Application November 28, 1944, Serial No. 565,482

12 Claims. (Cl. 18—42)

1

My invention relates to the art of injection molding and has particular reference to an apparatus which makes it possible to mold a great variety of small objects which may differ from one another without it being necessary to alter the die cavities in any substantial way.

Among the objects of my invention is to provide a new and improved method by means of which small objects such as ophthalmic lenses can be cast in such variety that there are actually more lenses of different kinds capable of being produced in a machine than the number of die cavities present for that purpose.

Another object of my invention is to provide a new and improved apparatus for the production of die-molded objects of various character which is made possible by the substitution of different liners in mold cavities so that a different contour may be given to successively molded objects without its being necessary to completely replace the dies in order to effect those changes.

Still another object of my invention is to provide a new and improved precision injection molding device wherein the parts which give the precise form to the molded articles are in the nature of inserts which can be removed from the stationary portions of the device and replaced by other inserts in order to minimize the cost of the precision parts.

Still another object of my invention is to provide a new and improved apparatus for casting a variety of shapes in molded articles, the variety of which can be changed by shifting one half of a set of dies having multiple cavities therein with respect to a second set of dies having similar cavities so that the cavities in one set of dies may be matched successively with the cavities in the other set of dies.

A still further object of my invention is to provide a mold block within which is positioned a rotatably mounted die block or holder which has within it a series of dies of different shape or size matched with similar dies in an opposing die block, the first die block being so arranged that the die cavities therein can be shifted from position to position without any realignment.

It will be apparent from the accompanying drawings and the following description that while many elements of the method as well as the structure are familiar to the art of making injection moldings, old elements and new have been marshaled together to produce a new and novel injection molding process together with a machine in which it can be practiced entirely distinct from anything heretofore practiced which is easy to fabricate and operate and which is more efficient than previous injection molding processes and one which has a versatility especially valuable in the manufacture of ophthalmic lenses.

Figure 1:
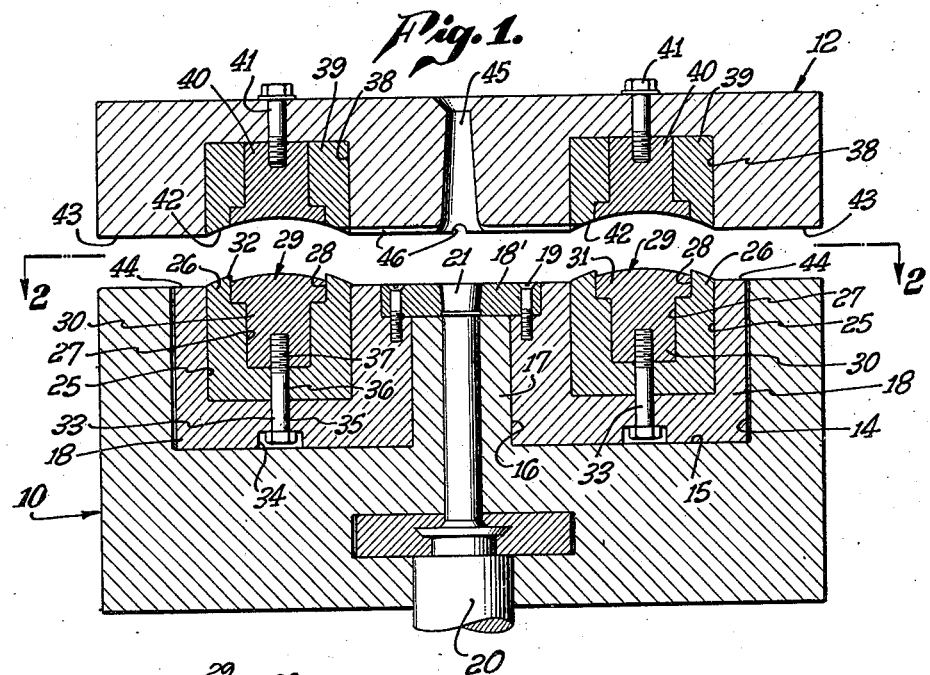
Fig. 1 is a longitudinal sectional view of the injection molding device showing the die parts separated one from another.

In the production of injection molded articles of the nature of ophthalmic lenses it is necessary that the finished product be as near perfect as possible with respect to the smoothness and curvature of opposite sides of the article. The dies must be absolutely smooth and true and of such nature that when the moldable material such as plastic is forced into the die cavities every portion of the space will be packed solidly under pressure so that the molded object will conform precisely to the walls of the die cavity without any further polishing or trimming being necessary to remove the customary fin or flash.

It is also true that in the molding of ophthalmic lenses which are corrected in accordance with the condition of the eyes of the wearer a great variety of lenses must customarily be produced. Because of the fact that these lenses vary so greatly it is highly impractical to store lenses of one power or another in any considerable quantity since there is no means of foretelling how promptly those particular lens characteristics will be needed. Therefore if lenses are to be turned out promptly and efficiently some means must be provided for easily and efficiently varying the optic power of the lenses without it being necessary to entirely refit the dies for every new set of lenses which are required.

In order to make possible the construction of an apparatus which will permit the exercise of an easy method of varying the dioptic power of lenses there has been provided an injection molding apparatus having a number of die cavities on each side which are symmetrically positioned about a center so that one may be rotated with respect to the others thereby adding considerably to the variations which can be produced in the finished object by a relatively minor shift in position of the die cavities.

It is felt that the method herein disclosed can best be described in connection with a type of apparatus in which it can be conveniently practiced. Following this purpose there is shown a split mold injection device which consists of a lower mold block 10 and an upper mold block 12 which by reciprocating means of a conventional sort may be mechanically and automatically separated initially in order to permit the parts to be properly fitted and which then can be moved together, locked in place during the pouring of the moldable material and then separated one from the other in order to permit the molded objects to be ejected.

In the lower mold block there is provided an annular recess 14 having a bottom 15 and an inside wall 16 defined by a boss 17 located at the center of the mold block.

Within the annular recess is a die block 18 shaped to conform to the annular recess and with the outside portion and the bottom surface ground in order that the surfaces thereof may slide upon the corresponding surfaces of the annular recess which have also been surface ground and thereby provide an extremely smooth but nevertheless movable fit between the two parts. An anchor block 18' is shown attached to the die block by means of screws 19 and is instrumental in holding the die block in place in the mold block. To assist in holding the die block in place there is provided a shaft 20 which extends upwardly through the mold block and the boss 17 and thence through the anchor block 18' to the upper portion thereof wherein a widened portion 21 of the shaft engages the anchor block.

Figure 2:
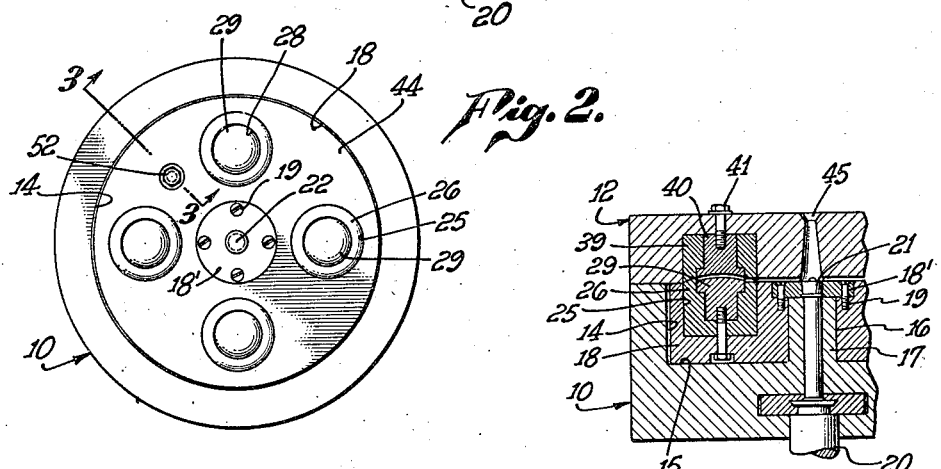
Fig. 2 is a plan view of the lower die block taken on the line 2—2 of Fig. 1.
Figure 4:
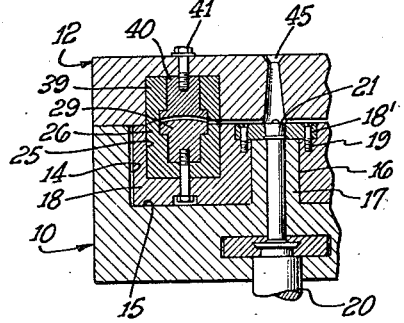
Fig. 4 is a part sectional view similar to Fig. 1 with the parts in closed position.
Figure 3:
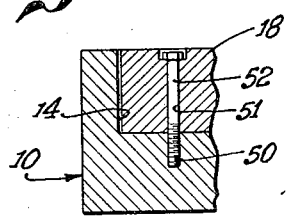
Fig. 3 is a fragmentary section taken on line 3—3 of Fig. 2.

As best seen in Fig. 2 the die block contains a series of apertures 25 arranged symmetrically about a center axis 22 in the form of a star so that each is equidistant from the center and is likewise identical in size and shape.

Inserts 26 are provided which fit precisely within the apertures 25.

Each insert is provided with a central aperture 27 which is identical in the case of each insert arranged about the center point. The apertures spread outwardly at the upper portion 28 in order to accommodate a pad 29 which is designed to be inserted therein. The pad, it will be noted, has a cylindrical lower portion 30 and a flanged upper portion 31 so that the lower portion 30 initially guides the pad into place whereas the upper portion 31 fills the correspondingly widened part of the aperture.

As a further consideration there is provided an upstanding outer rim 32 on the insert the upper curved surface of which is above the level of the upper curved surface of the pad. The difference in elevation between the two is the measure of the thickness of the lens which is to be cast.

In order to hold the pad in place there is provided a machine screw 33 which fits within a cavity 34 in the annular die block and which extends upwardly through a bolt hole 35 therein and a second bolt hole 36 in the insert and thence into a threaded axial hole 37 in the pad. The pad is thus locked in place in the die block by means of the bolt.

The opposed mold block 12 is located above and exactly opposite the lower mold block 10. Since it is necessary for only one set of die cavities to move relative to the other there is no rotatably movable die block provided for the upper mold block. In its stead the upper mold block is provided with cavities 38 arranged symmetrically about a common axis and in the cavities are positioned inserts 39 which carry pads 40 so designed in size that they fit snugly within the inserts. The pads may be held in place by means of a machine screw or bolt 41 similar in design to the bolt 33. In the case of the inserts of the upper die block it should be noted that on the lower face of the insert there is provided a smooth curved surface 42 which is designed to contact with a complementarily curved surface 32 on the upper edge of the inserts in the lower die block. Note also on the upper insert there is a flat land 43 which is designed to engage the upper flat surface 44 of the die block which surrounds the insert. The entire surface of the combined upper pad and insert is in one continuous curved plane and so positioned that when the mold blocks are moved together the surfaces of the pads are separated one from another by a predetermined distance thereby providing the die cavity.

A sprue hole 45 is provided at the center of the upper mold block and is the means through which the moldable plastic is forced into the die. Gates 46 communicate between the sprue hole and the die cavities in order to admit the plastic or other material which is being used for molding purposes.

In operation the lower mold block is set up so that the annular die block is in place and held therein by means of the anchor block 18'. Prior to its being placed in the mold block the die block is equipped with the inserts. In each insert there is positioned a pad and it is the upper surface of this pad which provides a bottom for the mold cavity once the mold blocks are moved together. With the annular die block thus equipped with pads forming together with the inserts a die cavity the entire die block assembly is mounted in the mold block and anchored therein by means of the anchor block 18' and screws 19. This anchoring only holds the die block in place endwise since it must be permitted to rotate freely about the boss 17.

In order to set the die block at any particular point there may be provided a set of holes 50 in the mold block at predetermined positions. The die block is likewise provided with a hole 51 and in the hole is positioned a bolt, shaft or other device 52. The holes 50 are so positioned that when the hole 51 is in alignment with any one of them, the inserts in the lower die block will be in precise alignment with one set of inserts in the upper die block, the bolt having locked the rotatable die block so that its position remains fixed with relation to the lower mold block.

As soon as the die blocks have been thus locked in position the machine in which the parts are mounted is rotated so that the upper mold block lowers against the lower mold block. When the upper mold block is locked in place against the lower mold block it will be noted that the curved surface 42 in the upper insert is in snug, intimate contact with the curved surface 32 on the top of the ower insert. Because of the fact that the flange on the pad 29 is below the surface of contact just described a cavity will remain between the curved surface 42 and the upper face of the pad 30. At this point the adjacent faces of the respective mold blocks will likewise be in contact. It should be borne in mind, however, that this contact while close enough to inhibit the passage of molten molding material is nevertheless wide enough to permit air to escape along the parting line as the die cavity is filled.

After the parts have been locked in place as just described a thermoplastic is injected into the sprue hole 45 under pressure from whence it flows through the gates 46 into the die cavities. The liquid is kept under pressure until the die cavities are completely filled and until an initial solidification has taken place. At this point the mold blocks are separated one from another and the molded articles thus formed in the cavities may be extracted. Because of the fact that the faces of the pads are perfectly smooth the lenses or other articles molded by this process will come out of the die cavities perfectly smooth on both sides.

The curvature of the lenses and that is to say the dioptic power of the lenses depends upon the relative curvatures between opposite faces of the lens. In the method which may be practiced by this invention the dioptic power may be varied by shifting the pads in relation to each other so that pads of different curvature will come into position. For example, with the parts as shown on the left side of Fig. 1 let it be assumed that the upper surface of pad 30 has a curvature identified as a power of +5.75 diopters. Then let us assume that the concave surface of the insert in the upper mold block has a power of −4.25 diopters. Thus the curvature on opposite sides will be different. The arithmetical sum will be +1.50 diopters which will be the power of the lens.

Now let us assume that the pad in the next adjacent insert in the lower die block has a power of +6.75 diopters. It will be possible therefore by rotating the lower die block one space to place the pad with the +6.75 diopter power opposite the previously mentioned insert in the upper pad. This combination will produce a lens having a dioptic power of +2.50. In order to get this change it is necessary only to remove the bolt 51 from its position locking the lower die block with relation to the lower mold block, rotate the die block one space and then again lock it in place.

By a similar arrangement each one of the pads in the lower die block may be provided with a different curvature so that each of the four pads shown may be successively rotated so that one at a time they are positioned beneath the insert in the upper mold block having the dioptic power of 4.25 and thereby permit the fabrication of four lenses each having a different dioptic power.

By the same token the other inserts and pads in the upper mold block may be provided with concave curvatures of dioptic power different from the first so that in all there may be cast sixteen lenses each having a different dioptic power, this being twelve more variations than the number of die cavities involved.

In view of the fact that lens prescriptions vary considerably and are seldom the same a machine of this sort may be set up once with pads of the proper dioptic curvature so that the necessary variety of lenses may be cast without it being necessary to disassemble the machine and reassemble it with a different set of die cavities.

There has thus been disclosed a method for producing a wide variety of lenses of different dioptic powers by means of a relatively simple process illustrated by the apparatus described herein which makes possible the efficient production of ophthalmic lenses by an injection molding process without it being necessary to appreciably change the die cavities during use of the machine in order to vary the size and curvature of the cavities to take care of the wide variation in lenses.

I claim:

1. A split mold for the injection molding of castings of respectively varying contour comprising a mold block having a plurality of die cavities therein spaced symmetrically about a center point and faced off at the edges thereof, said block having a sprue hole and gates connecting the sprue hole with the cavities, an opposing mold block having an annular depression, a die block rotatably mounted in the depression, said die block having therein a plurality of centrally apertured cavities similar in size and relative position to the cavities in the first block, said die block being adapted to rotate and present the cavities in said die block successively in opposed position to cavities in the first mold block, a removable die pad in each of the cavities in said die block, said die pads presenting varying contours to the die cavities of the first mold block, said cavities in the die block being faced off at the edges and adapted to be positioned in contact with the faced off edge of the first die cavities to close the mold for an injection operation.

2. A split mold for the injection molding of castings of respectively varying contour from thermoplastic materials comprising a mold block having a plurality of cavity elements therein having each a central aperture and a plurality of pads receivable one in each aperture and forming the bottoms of die cavities, said block having a sprue hole and gates connecting the sprue hole with the die cavities; an opposing mold block having an annular depression, a die block rotatably mounted in the depression, said die block having therein a plurality of centrally apertured cavity elements similar in size, number and relative position to the cavity elements in the first mold block, a pad in each aperture forming the bottom of a die cavity and securing means connected to the die block and the pad for holding said pad in place, the edges of said cavity elements having matched faces adapted to contact and seal the cavity during an injection molding operation.

3. A split mold for the injection molding of opthalmic lenses from thermoplastic materials comprising: a mold block having a plurality of pockets, inserts therein having each a central aperture and a plurality of pads receivable one in each aperture and forming the bottoms of die cavities, said block having a single sprue hole and gates connecting the sprue hole with the die cavities; an opposing mold block having an annular depression, a die block rotatably mounted in the depression, and releasable means for holding said die block in place; said die block having a plurality of pockets similar in size, number and relative position to the pockets in the first mold block, inserts in the pockets having each a central aperture, a pad in each aperture forming the bottom of a die cavity and securing means connected to the die block and the pad for holding said pad in place, the edges of said inserts having matched faces adapted to contact and seal the cavity during an injection molding operation.

4. An interchangeable split mold device for the injection molding of castings of respectively varying contour comprising: a movable mold block having a plurality of die cavities therein and a die pad in each cavity; an opposing mold block having an annular depression and an annular die block rotatably secured in the depression, said die block having inserts corresponding in number and location to the cavities in the first mold block, said inserts having each a central aperture and die pads of respectively different curvature contained one in each of said central apertures, said die block having a plurality of positions wherein each die cavity in the die block is matched successively with each die cavity in the first mold block, and a locking means operable in each position of the die block.

5. An interchangeable split mold device for the injection molding of ophthalmic lenses from thermoplastic materials comprising: an axially movable, rotatably stationary mold block having a plurality of pockets therein, inserts in the respective pockets having each a central aperture and a removable die pad in each aperture of respectively different curvatures; an opposing stationary mold block having an annular depression and an annular die block rotatably secured in the depression, said die block having inserts corresponding in size, number and location to the inserts in the first mold block, said inserts having each a central aperture and die pads of respectively different curvatures contained one in each said central apertures, said die block having a plurality of positions wherein each die cavity in the die block is matched successively with each die cavity in the first mold block, and a locking means operable in each position of the die block.

6. An interchangeable split mold device for the injection molding of lenses comprising: a mold block having a plurality of circularly arranged die cavities therein having curved faces of different dioptic power forming the bottoms of the die cavities; an opposed mold block and a rotatably mounted die therein having a plurality of circularly arranged die cavities, removable pads having each a face curved for a different dioptic power forming the bottoms of said die cavities and means for holding the pads in the cavities having a released position adapted to permit removal of the pads for replacement by pads having still another dioptic power.

7. An interchangeable split mold device for the molding of lenses of respectively varying dioptic power comprising: a mold block having a plurality of circularly arranged pockets therein, removable forming pads having faces curved for different dioptic powers receivable one in each pocket and forming thereby a molding face for a die cavity; an opposed mold block and a rotatably mounted die therein having a plurality of circularly arranged pockets, a removable forming pad in each pocket having each a face curved for a different dioptic power and means for holding the pads in the pockets having a released position adapted to permit removal of the pad for replacement by a pad having a curved face of still different dioptic power.

8. A split mold for the molding of ophthalmic lenses from thermoplastic materials comprising: a mold block provided with a plurality of circularly arranged forming dies connected to a sprue hole; an opposing mold block having a rotatable die block; a plurality of cavities radially arranged in said die block, an insert in each of said cavities, a forming pad held by each insert, each pad being provided with an outer curved forming face, the curvature of at least one of said pads differing from the curvature of the others, edge portions of each insert forming an annulus around the forming face of the pad held by said insert, a corresponding annular portion in an opposing forming die adapted to cooperate with said annulus to regulate the thickness of the lens formed by the forming pads and indicia carried by edge areas of each of the pads indicating the magnitude and direction of curvature of each forming face whereby the dioptic power of the finished lens may be readily determined.

9. An adjustable split mold for selectively molding articles of varying contours comprising: a pair of mold blocks, one of said mold blocks carrying a rotatable die block provided with a plurality of spaced forming pads of different contour, means for releasably positioning said die block in said mold block, the other mold block carrying a matching number of die cavities, whereby each of the forming pads is selectively cooperable with any one of the die cavities.

10. In an adjustable, split mold for selectively molding articles of varying contours, the combination of: a pair of cooperatively related mold blocks, one of said mold blocks carrying an annular, rotatable die block provided with a series of spaced die cavities; a recessed insert in each cavity; a die pad in each recess; releasable locking means holding the rotatable die block in any one of a plurality of partially rotated positions in the mold block; the other mold block carrying a plurality of spaced dies in matching relation to the inserts and die pads of the first mold block, the inserts cooperating with the dies to space the die pads from the dies when said mold blocks are pressed together.

11. In an adjustable, split mold for selectively molding articles of varying contours, the combination of: a pair of cooperatively related mold blocks, one of said mold blocks carrying an annular, rotatable die block provided with a series of spaced die cavities; a recessed insert in each cavity; a die pad in each recess; means connecting each pad to said rotatable die block; releasable locking means holding the rotatable die block in any one of a plurality of partially rotated positions in the mold block; the other mold block carrying a plurality of spaced dies in matching relation to the inserts and die pads of the first mold block, the inserts cooperating with the dies to space the die pads from the dies when said mold blocks are pressed together.

12. In an adjustable, split mold for selectively molding articles of varying contours, the combination of: a pair of cooperatively related mold blocks, one of said mold blocks carrying an annular, rotatable die block provided with a series of spaced die cavities; a recessed insert in each cavity; a die pad in each recess; releasable locking means holding the rotatable die block in any one of a plurality of partially rotated positions in the mold block; the other mold block carrying a plurality of spaced dies in matching relation to the inserts and die pads of the first mold block, the inserts cooperating with the dies to space the die pads from the dies when said mold blocks are pressed together, said die pads and dies differing in surface curvature whereby articles of a variety of contours may be manufactured by locking the rotatable die block in different positions.

HOWARD G. HOFFER.

REFERENCES CITED

The following references are of record in the file of this patent:

UNITED STATES PATENTS

| Number | Name | Date |
| --- | --- | --- |
| 1,143,895 | Essick | June 22, 1915 |
| 2,227,966 | Emsley | Jan. 7, 1941 |
| 2,364,745 | Moule | Dec. 12, 1944 |

FOREIGN PATENTS

| Number | Country | Date |
| --- | --- | --- |
| 12,511 | Great Britain | 1904 |